United States Patent
Tsuji et al.

(10) Patent No.: US 12,523,819 B2
(45) Date of Patent: Jan. 13, 2026

(54) OPTICAL MEMBER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Masatoshi Tsuji, Nisshin (JP); Hiroshi Ando, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 437 days.

(21) Appl. No.: 18/145,109

(22) Filed: Dec. 22, 2022

(65) Prior Publication Data

US 2023/0280539 A1 Sep. 7, 2023

(30) Foreign Application Priority Data

Mar. 2, 2022 (JP) .................... 2022-031841

(51) Int. Cl.
*G02B 6/34* (2006.01)
*B60R 1/00* (2022.01)

(52) U.S. Cl.
CPC .............. *G02B 6/34* (2013.01); *B60R 1/007* (2013.01)

(58) Field of Classification Search
CPC ............ G02B 6/005; G02B 6/34; G02B 6/0033–0038; G02B 6/0053; G02B 6/0015–0018; B60R 1/007; B60R 1/081; B60R 1/082

See application file for complete search history.

(56) References Cited

U.S. PATENT DOCUMENTS

| | | | |
|---|---|---|---|
| 10,365,489 B2 * | 7/2019 | Sekiguchi | G02B 6/0053 |
| 10,444,510 B1 * | 10/2019 | Lee | G02B 27/0172 |
| 12,153,241 B2 * | 11/2024 | Ando | G02B 23/08 |
| 2011/0128470 A1 | 6/2011 | Yorita et al. | |
| 2015/0309264 A1 * | 10/2015 | Abovitz | G02B 6/32 385/33 |
| 2018/0166531 A1 | 6/2018 | Bolotnikov et al. | |

(Continued)

FOREIGN PATENT DOCUMENTS

| | | |
|---|---|---|
| JP | 2003-058071 A | 2/2003 |
| JP | 2015-018178 A | 1/2015 |
| JP | 2015-143087 A | 8/2015 |

*Primary Examiner* — Jennifer D. Carruth
(74) *Attorney, Agent, or Firm* — Posz Law Group, PLC

(57) ABSTRACT

An optical member includes a light guide having: an incident surface on which an external scene light is incident from a blind area; a first reflecting surface that reflects light from the incident surface; and a second reflecting surface that reflects light reflected by the first reflecting surface. The optical member further includes a prism having: an exit surface that emits light from the incident surface and light reflected by the second reflecting surface to outside; and a light shielding surface connected to the exit surface to intersect the exit surface. A light from the incident surface and a light reflected by the second reflecting surface are incident on the light shielding surface. The light shielding surface has a rough surface, and a surface roughness of the rough surface is larger than a surface roughness of the exit surface.

5 Claims, 17 Drawing Sheets

(56) References Cited

U.S. PATENT DOCUMENTS

2019/0140048 A1 5/2019 Bolotnikov et al.
2019/0148485 A1 5/2019 Hamada et al.
2023/0058463 A1 2/2023 Ando et al.

* cited by examiner

OPTICAL MEMBER

CROSS REFERENCE TO RELATED APPLICATION

This application is based on Japanese Patent Application No. 2022-031841 filed on Mar. 2, 2022, the disclosure of which is incorporated herein by reference.

TECHNICAL FIELD

The present disclosure relates to an optical member.

BACKGROUND

A blind spot assistance device includes a semi-transmissive mirror, a mirror, a transparent member, and prisms. The semi-transmissive mirror is provided on the viewer side. The mirror reflects light to the semi-transmissive mirror. The transparent member is provided between the semi-transmissive mirror and the mirror. The prisms are provided between the semi-transmissive mirror and the viewer.

SUMMARY

An optical member includes a light guide and a prism. The light guide has: an incident surface on which an external scene light is incident from a blind area; a first reflecting surface that reflects light from the incident surface; and a second reflecting surface that reflects light reflected by the first reflecting surface. The prism has: an exit surface that emits light from the incident surface and light reflected by the second reflecting surface to outside; and a light shielding surface connected to the exit surface to intersect the exit surface. The light shielding surface is arranged such that light from the incident surface and light reflected by the second reflecting surface are incident on the light shielding surface. The light shielding surface has a rough surface, and a surface roughness of the rough surface is larger than a surface roughness of the exit surface.

DETAILED DESCRIPTION

Figure 1:
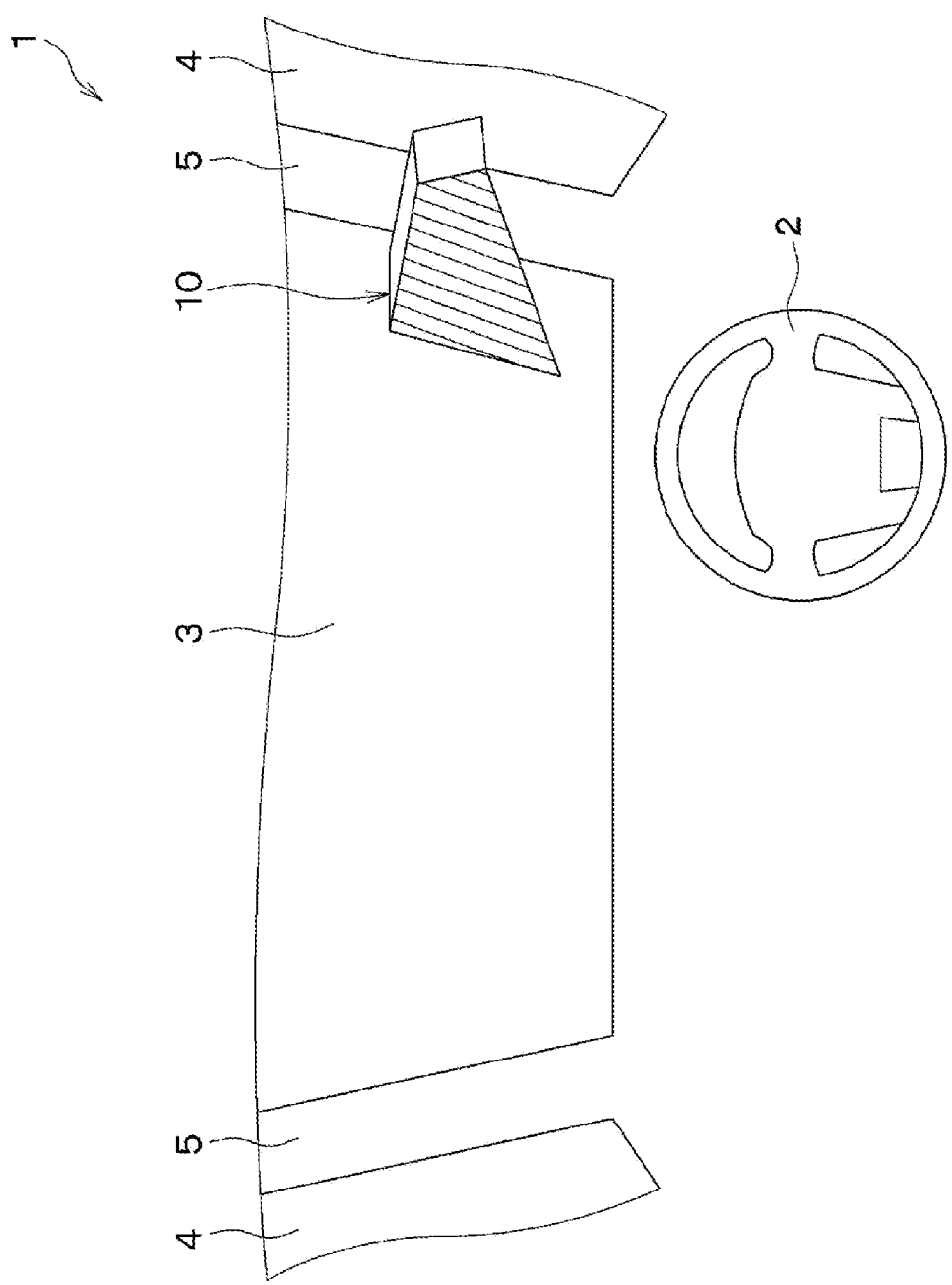
FIG. 1 is a configuration diagram of a vehicle having an optical member of a first embodiment.

To begin with, examples of relevant techniques will be described. A blind spot assistance device includes a semi-transmissive mirror, a mirror, a transparent member, and prisms. The semi-transmissive mirror is provided on the viewer side. The mirror reflects light to the semi-transmissive mirror. The transparent member is provided between the semi-transmissive mirror and the mirror. The prisms are provided between the semi-transmissive mirror and the viewer. Each of the prisms has a light shielding layer on a surface that does not face the light incident surface of the transparent member. The light shielding layer shields light incident from the viewer side.

According to the study by the inventors, in the blind spot assistance device, the incident light from the viewer side becomes a stray light. Further, light passing through the incident surface of the transparent member and reflected by the interface between the prism and the light shielding layer becomes a stray light when passing through the exit surface of the transparent member. The stray light reduces the visibility of the sight of the blind spot area. The present disclosure provides an optical member that improves a visibility of a sight of a blind spot area.

According to an aspect of the present disclosure, an optical member includes a light guide and a prism. The light guide has: an incident surface on which an external scene light is incident from a blind area; a first reflecting surface that reflects light from the incident surface; and a second reflecting surface that reflects light reflected by the first reflecting surface. The prism has: an exit surface that emits light from the incident surface and light reflected by the second reflecting surface to outside; and a light shielding surface connected to the exit surface to intersect the exit surface. The light shielding surface is arranged such that light from the incident surface and light reflected by the second reflecting surface are incident on the light shielding surface. The light shielding surface has a rough surface, and a surface roughness of the rough surface is larger than a surface roughness of the exit surface.

Accordingly, when the light from the incident surface and the light reflected by the second reflecting surface are incident on the light shielding surface, the light is scattered by the rough surface of the light shielding surface. Therefore, the amount of light traveling from the light shielding surface toward the exit surface is reduced. Therefore, it becomes difficult for the light reflected by the light shielding surface to reach the exit surface. As a result, a stray light is less likely to reach the viewer, thereby improving the visibility of the scene of the blind spot area.

According to another aspect of the present disclosure, an optical member includes a first prism, a light guide, and a second prism. The first prism has: an incident surface on which an external scene light is incident from a blind area; and a light shielding surface connected to the incident surface and into which the external scene light is incident. The light guide has: a first reflecting surface that reflects light from the incident surface; and a second reflecting surface that reflects light reflected by the first reflecting surface. The second prism has: an exit surface that emits light from the incident surface and light reflected by the second reflecting surface; and a surface connected to the exit surface to intersect the exit surface, such that light from the light shielding surface being incident on the surface. The light shielding surface has a rough surface, and a surface roughness of the rough surface is larger than a surface roughness of the incident surface.

As a result, when an external scene light is incident on the light shielding surface, the light is scattered by the rough surface. Therefore, the amount of light that travels from the light shielding surface toward the surface connected to the exit surface is reduced. Therefore, it becomes difficult for the light from the light shielding surface to reach the surface connected to the exit surface. Thus, since the light from the light shielding surface is less likely to be reflected by the surface connected to the exit surface, the light reflected by the surface connected to the exit surface is less likely to reach the exit surface. As a result, a stray light is less likely to reach the viewer, thereby improving the visibility of the scene of the blind spot area.

A reference numeral attached to each component or the like indicates an example of correspondence between the component or the like and specific component or the like described in embodiments below.

Hereinafter, embodiments will be described with reference to the drawings. In the following embodiments, portions that are mutually the same or equivalent are denoted by the same reference signs, and the description thereof will be omitted.

First Embodiment

An optical member 10 of this embodiment is used in, for example, a vehicle 1. As shown in FIG. 1, the vehicle 1 includes a steering wheel 2, a windshield 3, side windows 4, pillars 5, and an optical member 10. The optical member 10 is attached to, for example, the pillar 5. An external scene light Lo from a blind spot area due to the pillar 5 is guided to an occupant of the vehicle 1 by the optical member 10, so that the sight of the blind spot area can be seen by the occupant. The occupant of the vehicle 1 corresponds to a viewer.

Figure 2:
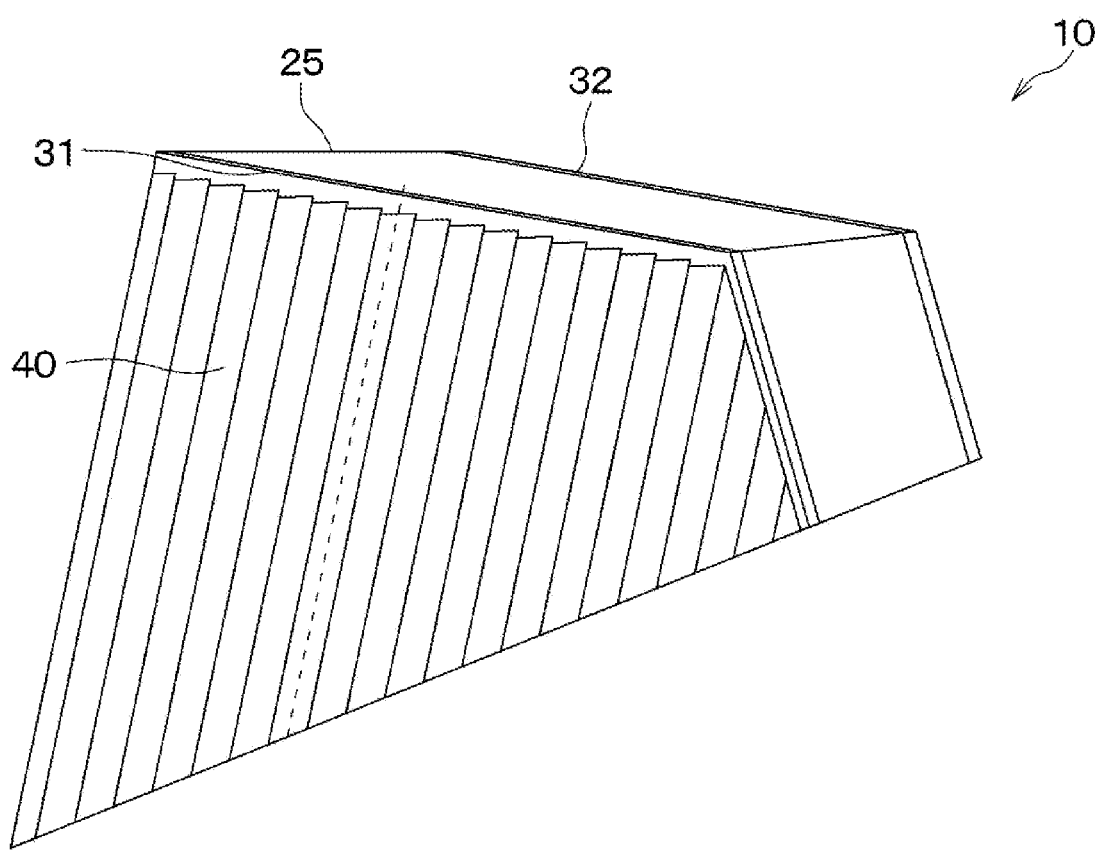
FIG. 2 is a perspective view of the optical member.
Figure 3:
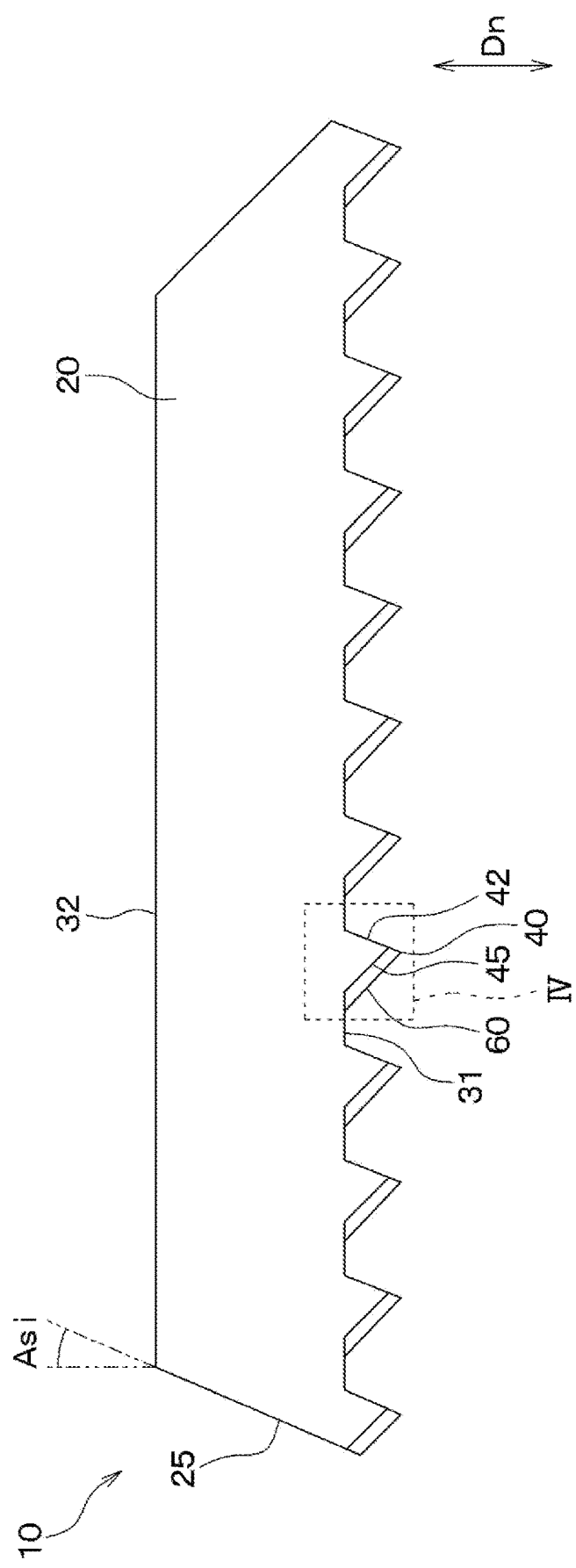
FIG. 3 is a cross-sectional view of the optical member.
Figure 4:
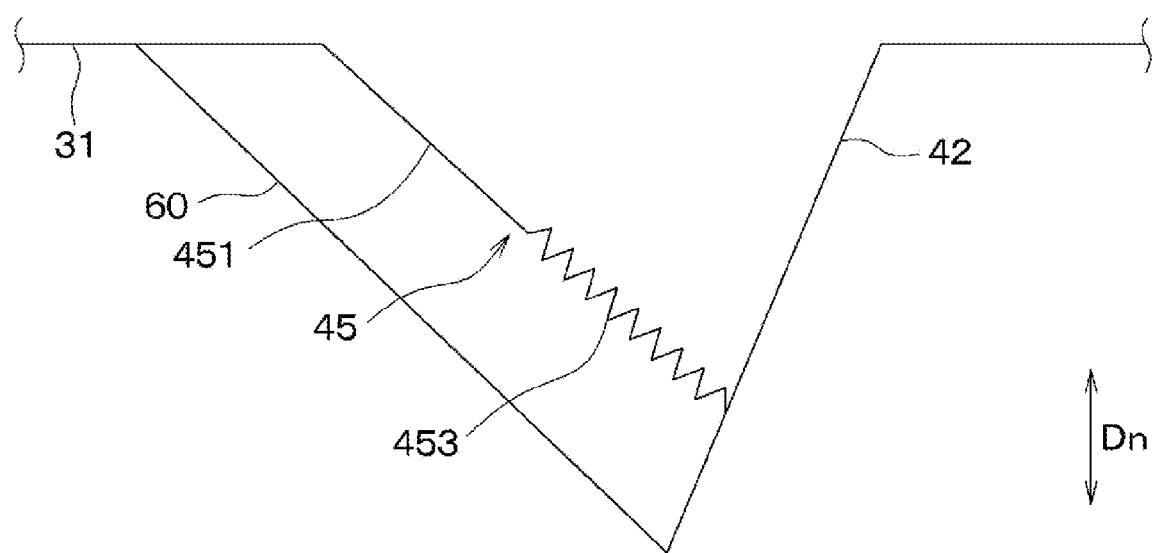
FIG. 4 is an enlarged view of an area IV of FIG. 3.

Specifically, as shown in FIGS. 2 to 4, the optical member 10 includes a light guide 20 and a light shielding layer 60. In FIGS. 3 and 4 and cross-sectional views to be described later, the hatching of the optical member 10 is omitted for easy understanding.

The light guide 20 is made of transparent material, for example, a resin material such as polyethylene terephthalate, polycarbonate, polyethylene and acrylic, or a glass material. The light guide 20 has an incident surface 25, a first reflecting surface 31, a second reflecting surface 32 and prisms 40.

The external scene light Lo is incident on the incident surface 25. The first reflecting surface 31 is arranged to face the occupant of the vehicle 1 and intersects the incident surface 25. The light from the incident surface 25 is reflected on the first reflecting surface 31. The second reflecting surface 32 is connected to the incident surface 25 on the side opposite to the first reflecting surface 31 and parallel to the first reflecting surface 31. The light reflected by the first reflecting surface 31 is reflected by the second reflecting surface 32.

A direction of the normal passing through the first reflecting surface 31 is defined as a normal direction Dn. The incident surface 25 is inclined with respect to the normal direction Dn. An incident surface angle Asi, which is an inclination angle of the incident surface 25 with respect to the normal direction Dn, is an acute angle. The light guide 20 has a refractive index of n1. The external medium of the light guide 20 has a refractive index of n2. When the light from the incident surface 25 is reflected by the first reflecting surface 31, the incidence angle is defined as $\theta i$. When the light reflected by the first reflecting surface 31 is reflected by the second reflecting surface 32, the incidence angle is defined as $\theta i$. At this time, the light guide 20 is formed so as to satisfy the following relational expression (1). As a result, the light from the incident surface 25 is totally reflected by the first reflecting surface 31 and the second reflecting surface 32 while the light guide 20 does not have a semi-transmissive mirror.

$$\sin \theta i \geq n2/n1 \qquad (1)$$

The prism 40 is formed by molding, cutting, blasting, etc., or a combination thereof when the light guide 20 is formed. The prism 40 protrudes from the first reflecting surface 31 and is formed in a triangular prism shape. Further, the prisms 40 are arranged at a predetermined interval. Thereby, the first reflecting surfaces 31 are arranged at a predetermined interval in the arrangement direction of the prisms 40. The prism 40 has a prism exit surface 42 and a prism light shielding surface 45.

The prism exit surface 42 is connected to the first reflecting surface 31. The prism exit surface 42 is parallel to the incident surface 25. Therefore, the prism exit surface 42 is inclined at the incident surface angle Asi with respect to the normal direction Dn. The root-mean-square height of the prism exit surface 42 is, for example, 0.005 µm. The light from the incident surface 25 and the light reflected by the second reflecting surface 32 are emitted from the prism exit surface 42. The root-mean-square height is measured, for example, by a measurement method conforming to ISO25178 and JISB0601.

As will be described later, the light from the incident surface 25 and the light reflected by the second reflecting surface 32 are incident on the prism light shielding surface 45, and the prism light shielding surface 45 blocks the light. Thereby, the prism light shielding surface 45 suppresses the light from becoming a stray light GL. Specifically, the prism light shielding surface 45 is connected across the prism exit surface 42. As shown in FIG. 4, the prism light shielding surface 45 has a flat surface 451 and a rough surface 453.

The flat surface 451 is connected to the first reflecting surface 31. The root-mean-square height of the flat surface 451 is, for example, 0.005 µm.

The rough surface 453 is connected to the prism exit surface 42 and the flat surface 451. The root-mean-square height of the rough surface 453 is higher than the root-mean-square height of the prism exit surface 42 and the flat surface 451. Therefore, the surface roughness of the rough surface 453 is larger than the surface roughness of the prism exit surface 42 and the flat surface 451. The root-mean-square height of the rough surface 453 is 0.1 µm or more. The ratio of the area of the rough surface 453 to the area of the prism light shielding surface 45 is 50% or more. In FIG. 4, the ratio of the area of the rough surface 453 to the area of the prism light shielding surface 45 is 50%. While the ratio of the area of the rough surface 453 to the area of the prism light shielding surface 45 is 50% or more, the ratio of the width of the rough surface 453 to the width of the prism light shielding surface 45 may be 50% or more.

Figure 11:
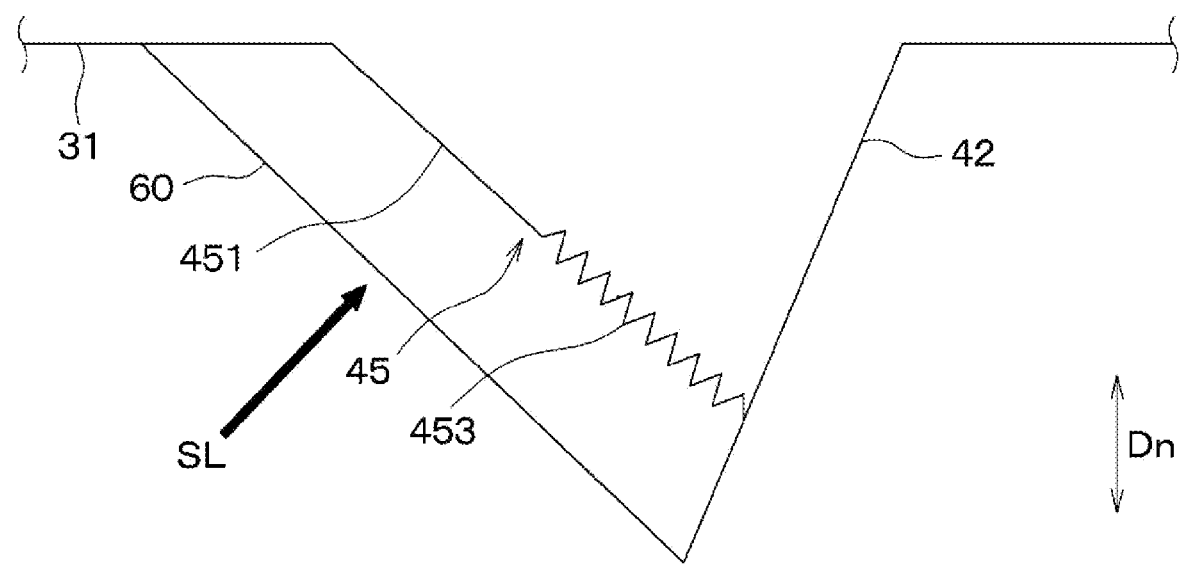
FIG. 11 is a schematic cross-sectional view showing light incident on a light shielding layer from outside of the optical member.

The light shielding layer 60 is made of a light absorbing film that absorbs 99% or more of light. The light shielding layer 60 is formed of, for example, a black resin by coating, printing, vapor deposition, or the like. Further, the light shielding layer 60 covers the entire surface of each prism light shielding surface 45. As shown in FIG. 11, the light shielding layer 60 shields the light SL travelling from the occupant side toward the prism light shielding surface 45. Although the light shielding layer 60 covers the entire surface of the prism light shielding surface 45, the light shielding layer 60 is not limited to this and may cover at least a part of the rough surface 453. while the light shielding layer 60 is made of black resin, it is not limited to black resin, and may be made of metal, for example.

Figure 5:
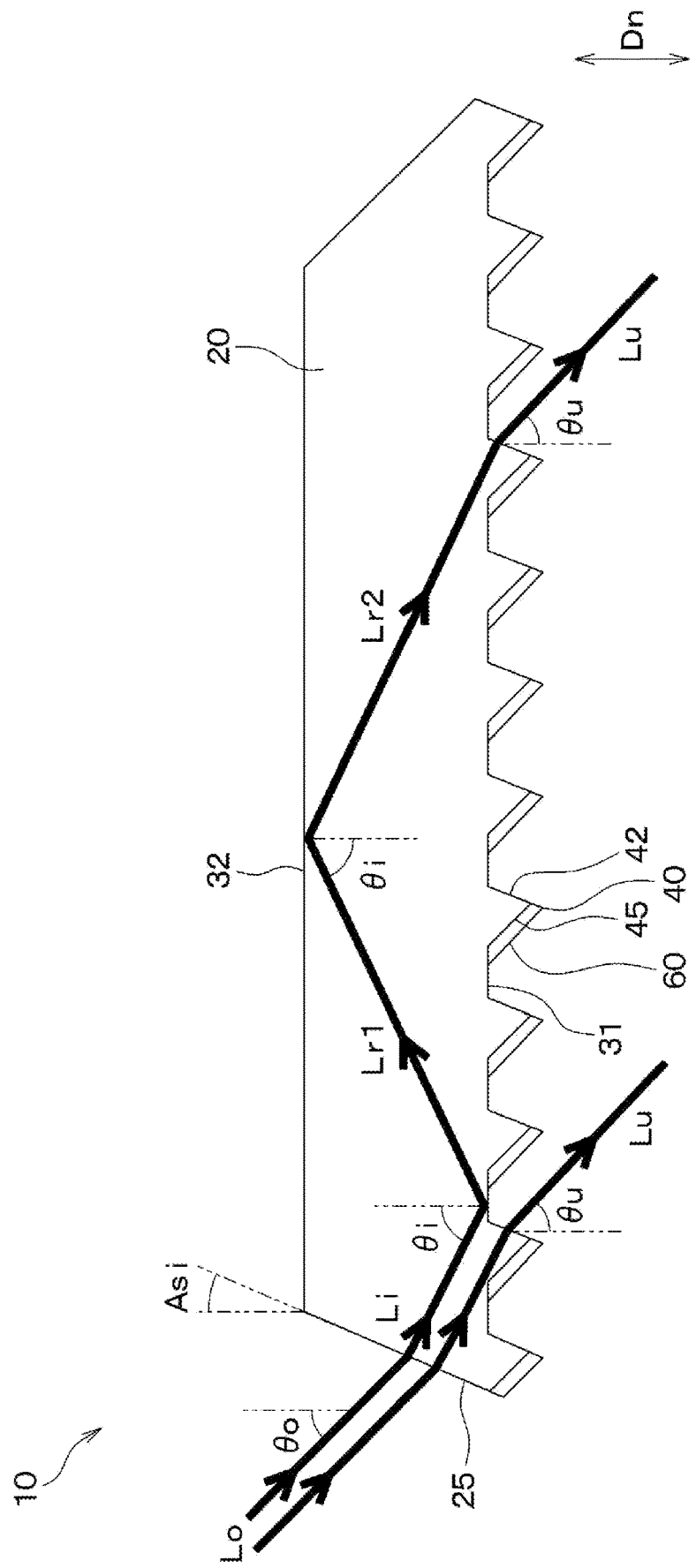
FIG. 5 is a schematic cross-sectional view showing an external scene light incident on an incident surface of the optical member.

The optical member 10 of the first embodiment is constructed as described above. In the optical member 10 of the present embodiment, the occupant of the vehicle 1 can visually recognize the scene in the blind area due to the pillar 5, and the visibility is improved. Next, with reference to FIG. 5, the visual recognition of the scene in the blind spot area will be described.

For example, when an external scene light Lo is incident on the incident surface 25 at an incidence angle $\theta o$, the light is refracted within the light guide 20 to become an incident light Li. Note that the incidence angle $\theta o$ is an angle formed between the traveling direction of the external scene light Lo and the normal direction Dn.

A part of the incident light Li travels toward the first reflecting surface 31 at the incidence angle $\theta i$ and reaches the first reflecting surface 31. The incident light Li is totally reflected by the first reflecting surface 31 and becomes the first reflected light Lr1. The first reflected light Lr1 travels toward the second reflecting surface 32 at the incidence angle $\theta i$ and reaches the second reflecting surface 32. The first reflected light Lr1 is totally reflected by the second reflecting surface 32 and becomes the second reflected light Lr2. The second reflected light Lr2 travels toward the prism exit surface 42 and reaches the prism exit surface 42. The second reflected light Lr2 is emitted from the prism exit surface 42 at an exit angle $\theta u$ that is the same as the incidence angle $\theta o$, and becomes an emitted light Lu. Then, as the emitted light Lu travels toward and reaches the occupant of the vehicle 1, the sight of the blind area due to the pillar 5 is visually recognized. The incidence angle $\theta i$ is defined between the traveling direction of the incident light Li and the normal direction Dn. The exit angle $\theta u$ is defined by the traveling direction of the emitted light Lu and the normal direction Dn. Since Ask<$\pi/2-\theta i$ is satisfied, the incidence angle $\theta i$ is larger than the incidence angle $\theta o$. As a result, the incident light Li travels toward a wide range of the first reflecting surface 31. Furthermore, the inclination angle of the prism light shielding surface 45 with respect to the normal direction Dn is equal to or greater than the incidence angle $\theta o$. Therefore, the emitted light Lu is emitted to the outside without being blocked by the prism light shielding surface 45, so that the loss in the amount of emitted light is reduced.

A part of the incident light Li travels toward the prism exit surface 42 and reaches the prism exit surface 42. The incident light Li that has reached is emitted from the prism exit surface 42 at the exit angle $\theta u$ that is the same as the incidence angle $\theta o$, and becomes the emitted light Lu. Then, as the emitted light Lu travels toward and reaches the occupant of the vehicle 1, the sight of the blind area due to the pillar 5 is visually recognized.

As described above, the occupant of the vehicle 1 can visually recognize the sight of the blind spot due to the pillar 5. Next, the improvement in the visibility of the scene in the blind spot area will be described.

Figure 6:
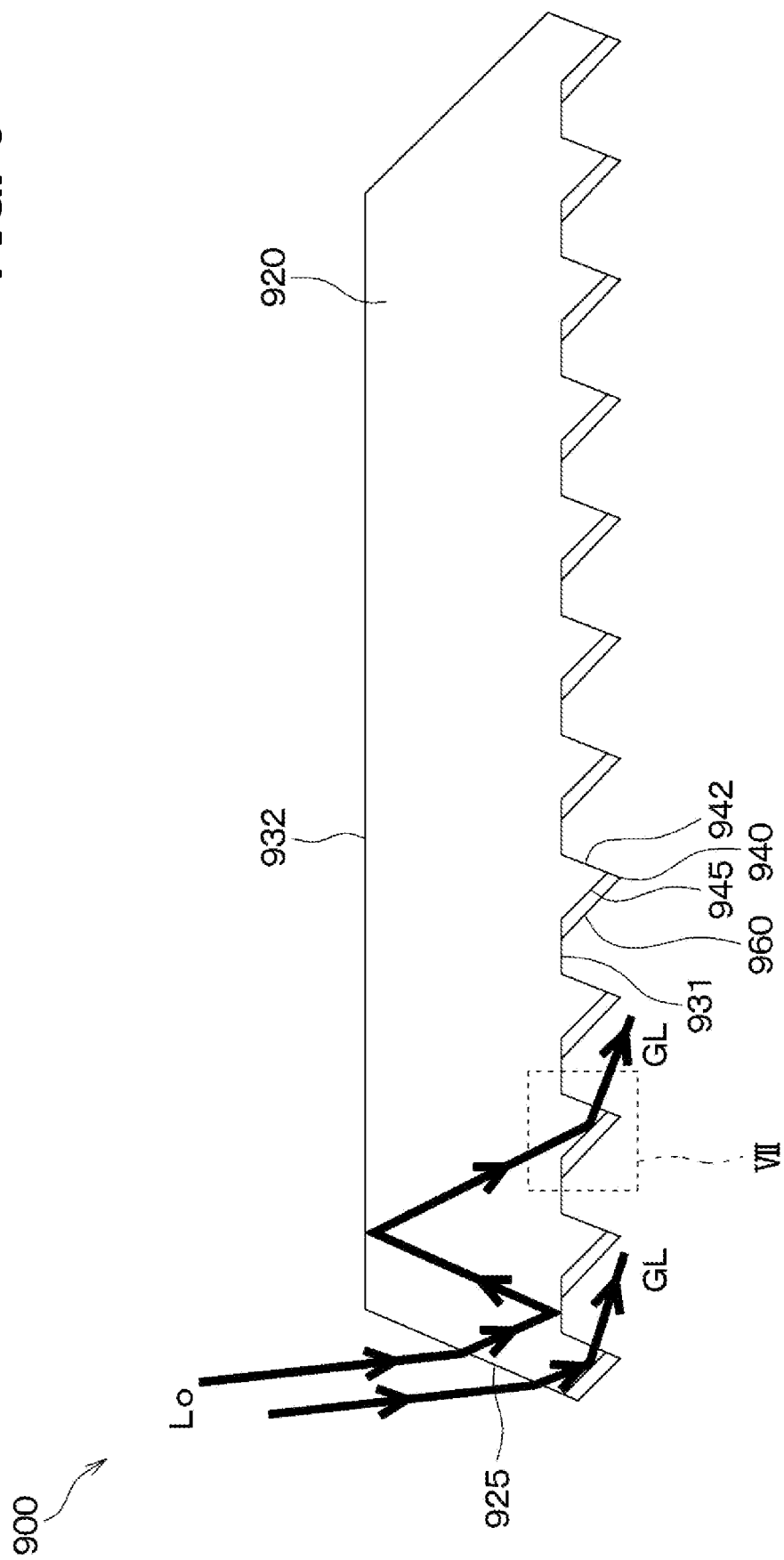
FIG. 6 is a schematic cross-sectional view showing an external scene light incident on an incident surface of a comparative optical member.
Figure 7:
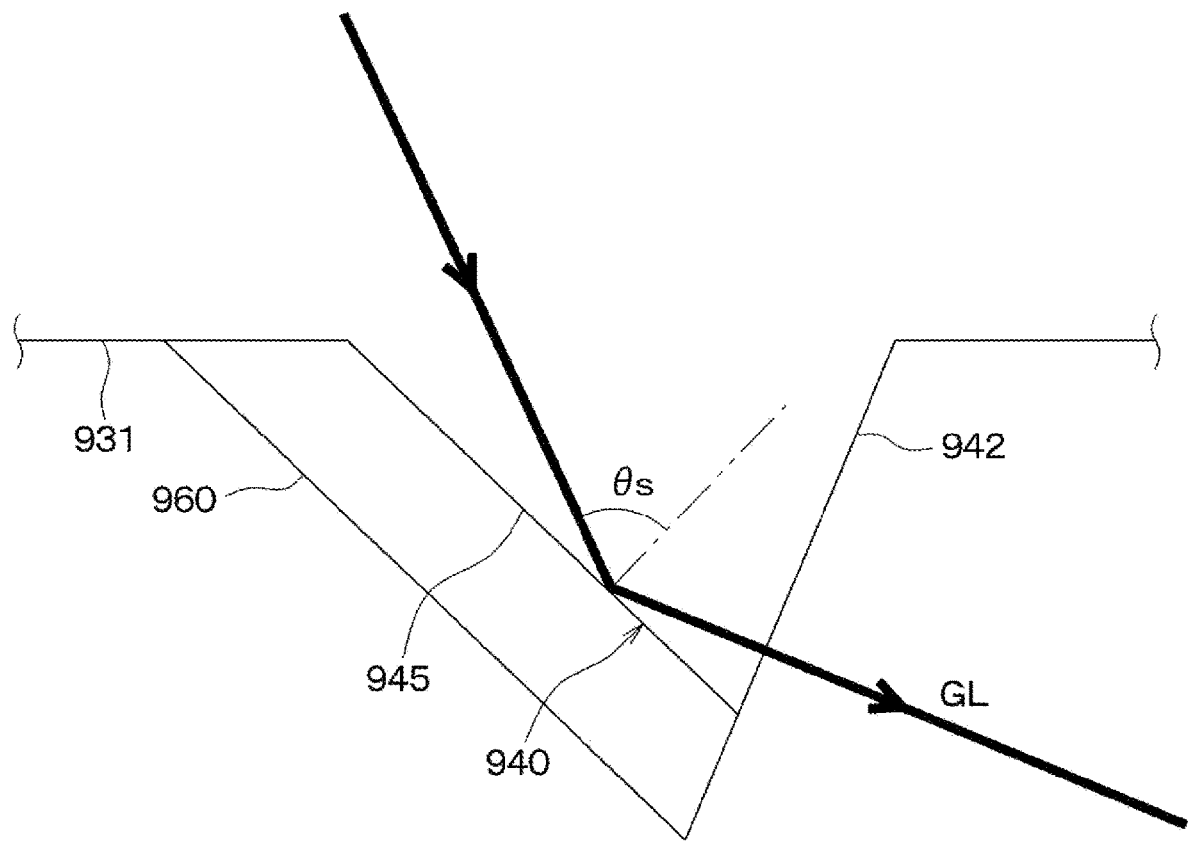
FIG. 7 is an enlarged view of an area VII of FIG. 6.

In order to explain the improvement in visibility by the optical member 10, a comparative optical member 900 will be explained as a comparative example. As shown in FIGS. 6 and 7, the comparative optical member 900 has a comparative light guide 920 and a comparative light shielding layer 960. The comparative light guide 920 corresponds to the light guide 20 and has a comparative incident surface 925, a comparative first reflecting surface 931, a comparative second reflecting surface 932 and comparative prisms 940. The comparative incident surface 925 corresponds to the incident surface 25. The comparative first reflecting surface 931 corresponds to the first reflecting surface 31. The comparative second reflecting surface 932 corresponds to the second reflecting surface 32. The comparative prism 940 has a comparative exit surface 942. The comparative exit surface 942 corresponds to the prism exit surface 42. The comparative light shielding layer 960 corresponds to the light shielding layer 60. Therefore, detailed description of these will be omitted.

The comparative prism 940 has a comparative flat surface 945 in addition to the comparative exit surface 942. The comparative flat surface 945 is connected to the first reflecting surface 31 and the comparative exit surface 942 and is covered with the comparative light shielding layer 960. The root-mean-square height of the comparative flat surface 945 is less than or equal to the root-mean-square height of the comparative exit surface 942.

Figure 8:
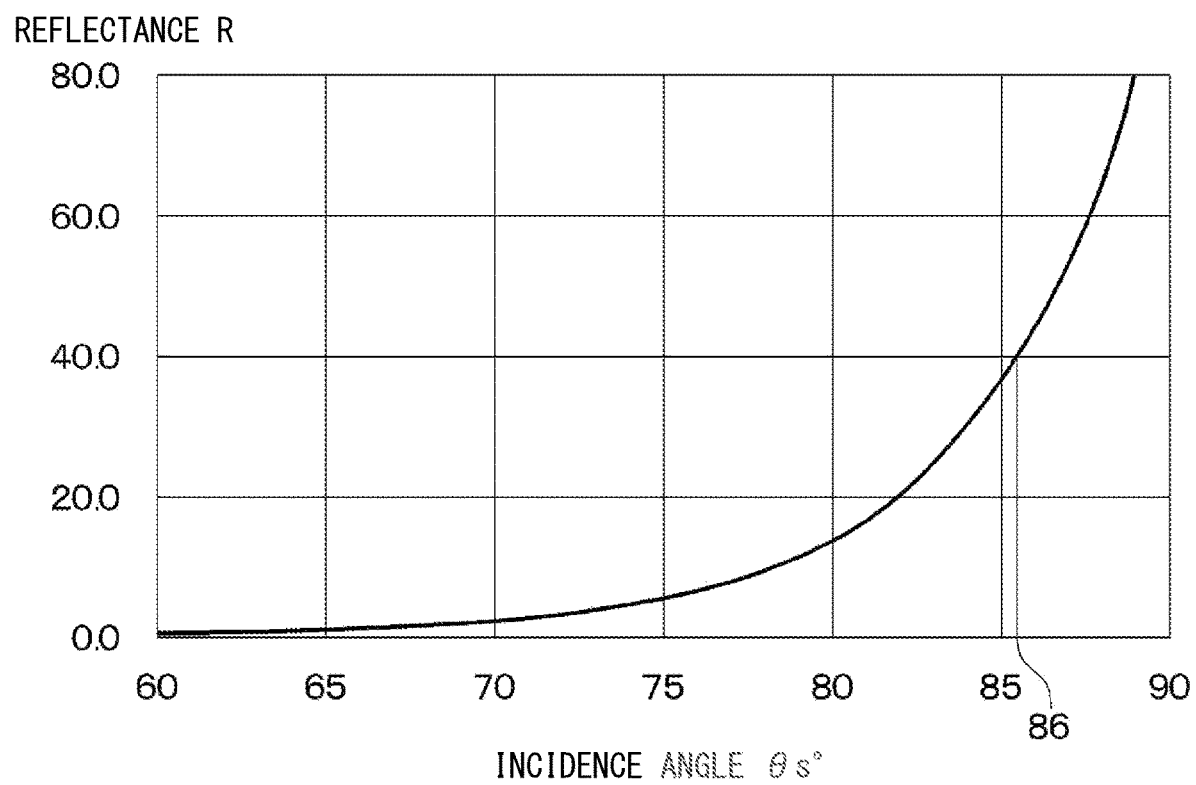
FIG. 8 is a graph showing a relationship between an incidence angle and a reflectance of light incident on a comparative flat surface.

The refractive index of the comparative light guide 920 is assumed to be 1.49. The refractive index of the comparative light shielding layer 960 is assumed to be 1.59. At this time, the difference in refractive index between the comparative light guide 920 and the comparative light shielding layer 960 is 0.1. In this case, when the external scene light Lo is incident on the incident surface 25, the light from the comparative incident surface 925 and the light reflected by the comparative second reflecting surface 932 may be reflected by the comparative flat surface 945. At this time, when the reflectance R reflected by the comparative flat surface 945 is calculated using the Fresnel reflection formula, as shown in FIGS. 7 and 8, the reflectance R increases as the incidence angle $\theta s$ of light reaching the comparative flat surface 945 increases. For example, when the incidence angle $\theta s$ is 86°, the reflectance R is as high as 40%. The reflectance R is the sum of the amplitude reflectance of the p-wave of light and the amplitude reflectance of the s-wave of light.

Further, the light reflected by the comparative flat surface 945 travels and reaches the comparative exit surface 942. The light that has reached is emitted from the comparative exit surface 942 and travels toward the occupant of the vehicle 1 to become a stray light GL. The stray light GL reduces the visibility of the sight in the blind area.

Figure 9:
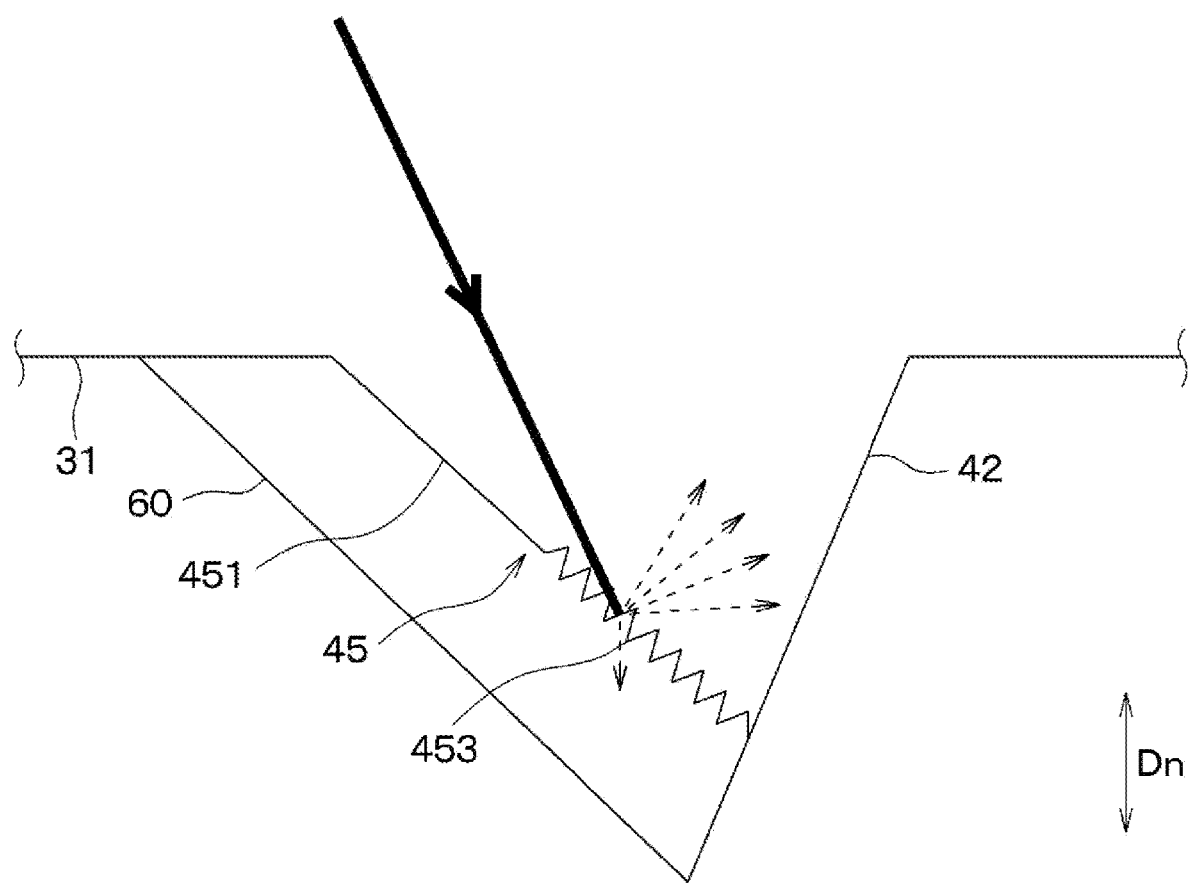
FIG. 9 is a schematic cross-sectional view showing light incident on a rough surface of the optical member.

In contrast, according to the optical member 10 of this embodiment, the surface roughness of the rough surface 453 is larger than the surface roughness of the prism exit surface 42. As a result, as shown in FIG. 9, when the light from the incident surface 25 and the light reflected by the second reflecting surface 32 are incident on the prism light shielding surface 45, the light is scattered at the rough surface 453 of the prism light shielding surface 45. Therefore, the amount of light traveling from the prism light shielding surface 45 toward the prism exit surface 42 is reduced. Therefore, it becomes difficult for the light reflected by the prism light shielding surface 45 to reach the prism exit surface 42. Therefore, it becomes difficult for the stray light GL to reach the occupant of the vehicle 1, thereby improving the visibility of the scene in the blind spot area.

The optical member 10 of the first embodiment also has the following effects.

[1-1] The prism light shielding surface 45 includes the flat surface 451 and the rough surface 453. The ratio of the area of the rough surface 453 to the area of the prism light shielding surface 45 is 50% or more. Since the area of the rough surface 453 of the prism light shielding surface 45 is equal to or greater than the area of the flat surface 451, the light from the incident surface 25 and the light reflected by the second reflecting surface 32 are more likely to be reflected by the rough surface 453. For this reason, the light incident on the prism light shielding surface 45 is likely to be scattered, and the amount of light traveling from the prism light shielding surface 45 toward the prism exit surface 42 is likely to decrease. Therefore, it becomes difficult for the light reflected by the prism light shielding surface 45 to reach the prism exit surface 42. Therefore, it becomes difficult for the stray light GL to reach the occupant of the vehicle 1, thereby improving the visibility of the scene in the blind spot area.

Figure 10:
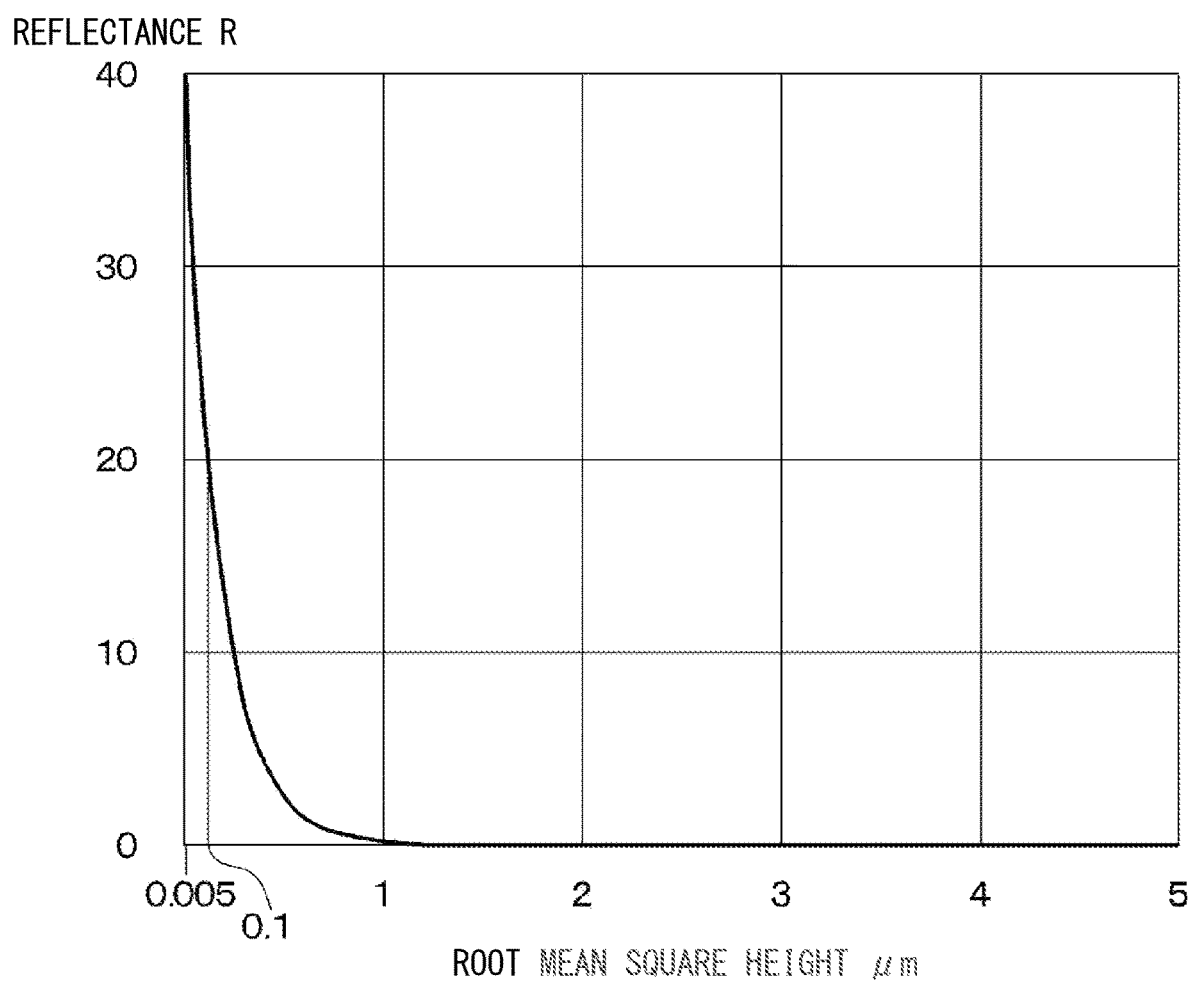
FIG. 10 is a graph showing a relationship between a root-mean-square height and a reflectance.

[1-2] The refractive index of the light guide 20 is assumed to be 1.49. The refractive index of the light shielding layer 60 is assumed to be 1.59. At this time, the refractive index difference between the light guide 20 and the light shielding layer 60 is 0.1. Also, assume that either the light from the incident surface 25 or the light reflected by the second reflecting surface 32 enters the rough surface 453 at an incidence angle $\theta s=86°$. In this case, as shown in FIG. 10, as the root-mean-square height of the rough surface 453 increases, the reflectance R on the prism light shielding surface 45 sharply decreases. Further, when the root-mean-square height of the rough surface 453 is 0.005 µm, the reflectance R is 40%. Furthermore, when the root-mean-square height of the rough surface 453 is 0.1 µm or more, the reflectance R on the prism light shielding surface 45 is 20% or less, and the root-mean-square height of the rough surface 453 becomes less than half of the case of 0.005 µm.

Therefore, in the optical member 10, the root-mean-square height of the rough surface 453 is 0.1 µm or more. As a result, the reflectance R is reduced to half or less compared to the case where the rough surface 453 is a smooth surface. Therefore, it becomes difficult for the light reflected by the prism light shielding surface 45 to reach the prism exit surface 42. Thus, it becomes difficult for the stray light GL to reach the occupant of the vehicle 1, thereby improving the visibility of the scene in the blind spot area.

[1-3] The optical member 10 further includes the light shielding layer 60 corresponding to a light shielding portion. The light shielding layer 60 covers the rough surface 453 and blocks light from the outside of the light guide 20. As a result, the light from the outside of the light guide 20 is blocked on the prism 40 side, as shown in FIG. 11, so that the light SL from the outside of the light guide 20 on the prism 40 side is suppressed from becoming a stray light.

In addition, due to the rough surface 453 having a higher root-mean-square height than the prism exit surface 42, the incidence angle of the light reaching the rough surface 453 becomes microscopically small. Therefore, the light reaching the rough surface 453 is refracted and easily travels toward the light shielding layer 60. Since the light that has traveled to the light shielding layer 60 is blocked by the light shielding layer 60, the amount of light that travels from the prism light shielding surface 45 toward the prism exit surface 42 tends to decrease. Therefore, it becomes difficult for the light reflected by the prism light shielding surface 45 to reach the prism exit surface 42. Therefore, it becomes difficult for the stray light GL to reach the occupant of the vehicle 1, thereby improving the visibility of the scene in the blind spot area.

[1-4] The light shielding layer 60 is made of a light absorbing film that absorbs light. As a result, the light from the outside of the light guide 20 on the prism 40 side is absorbed. Therefore, the light from the outside of the light guide 20 on the prism 40 side is likely to be blocked. Thus, the light SL from the outside of the light guide 20 is suppressed from becoming a stray light.

Second Embodiment

Figure 12:
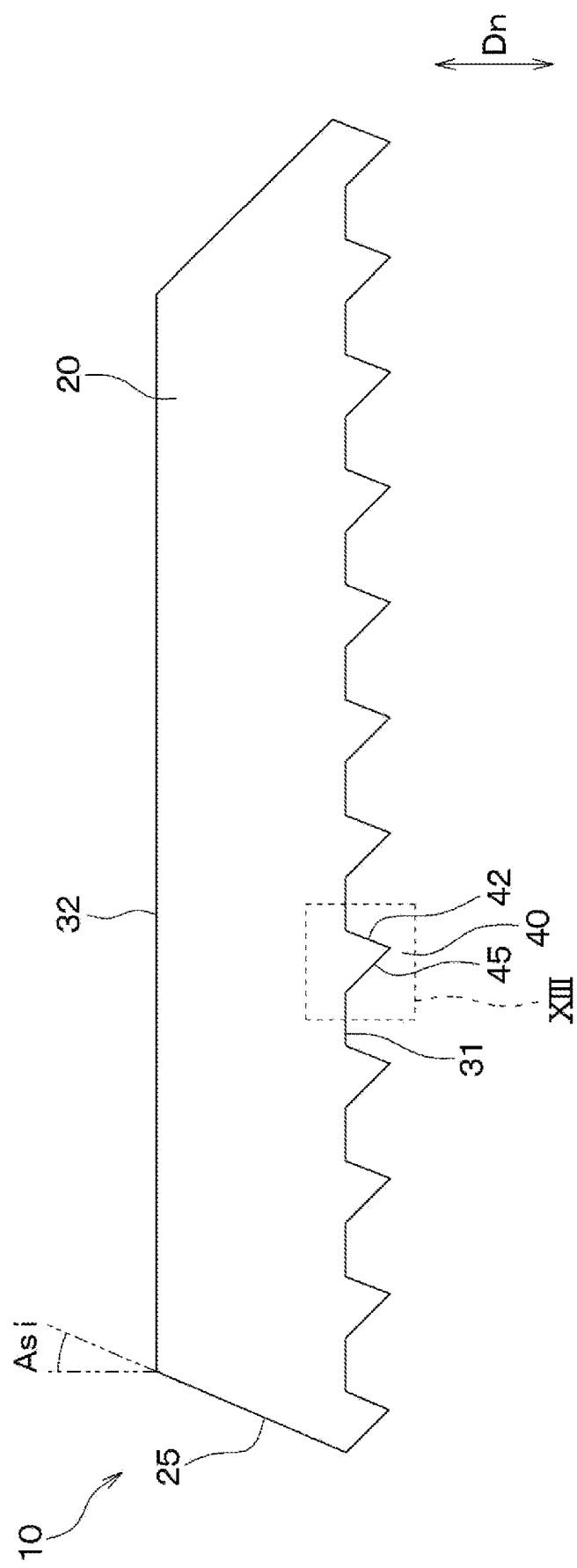
FIG. 12 is a cross-sectional view of an optical member according to a second embodiment.

In the second embodiment, as shown in FIG. 12, the optical member 10 does not have the light shielding layer 60. The other configurations are the same as those of the first embodiment.

Figure 13:
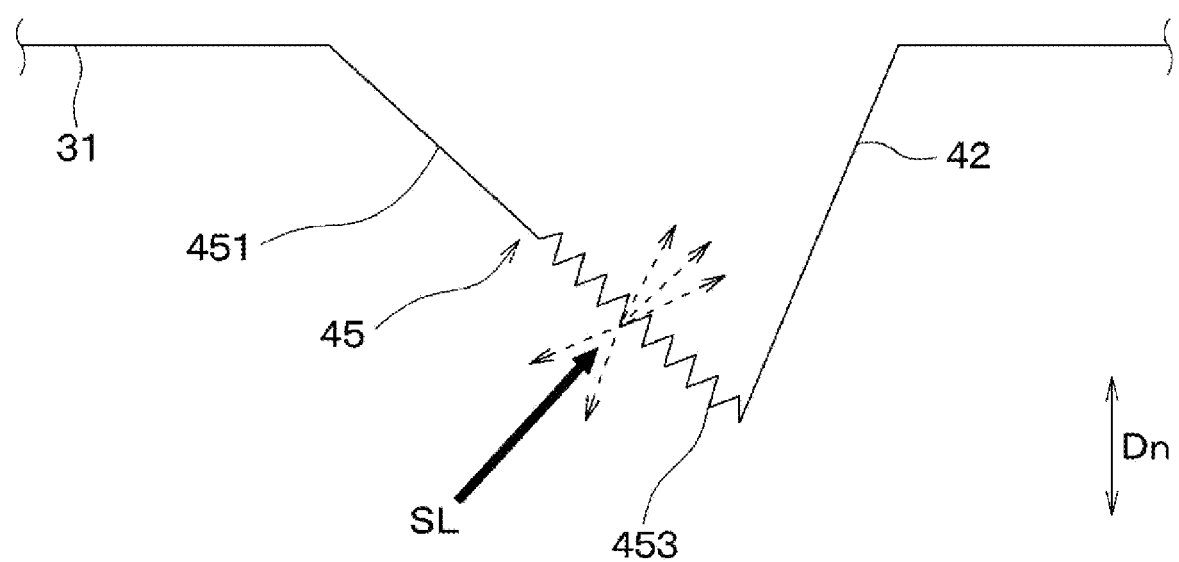
FIG. 13 is an enlarged view of an area XIII of FIG. 12.

In the second embodiment, as shown in FIG. 13, when the light SL incident from the occupant side travels and reaches the rough surface 453, a part of the light SL that has reached the rough surface 453 is reflected, and another part of the rest is scattered. As a result, the amount of light SL is reduced, so that the light SL is blocked. Since the rough surface 453 blocks the light SL, instead of the light shielding layer 60, the second embodiment has the same effect as the first embodiment. In the second embodiment, the following effects are also exerted.

[2] Since the optical member 10 does not have the light shielding layer 60, the manufacturing process of the optical member 10 is shortened by the process of forming the light shielding layer 60. This shortens the manufacturing time of the optical member 10 and reduces the cost of the optical member 10.

Third Embodiment

Figure 14:
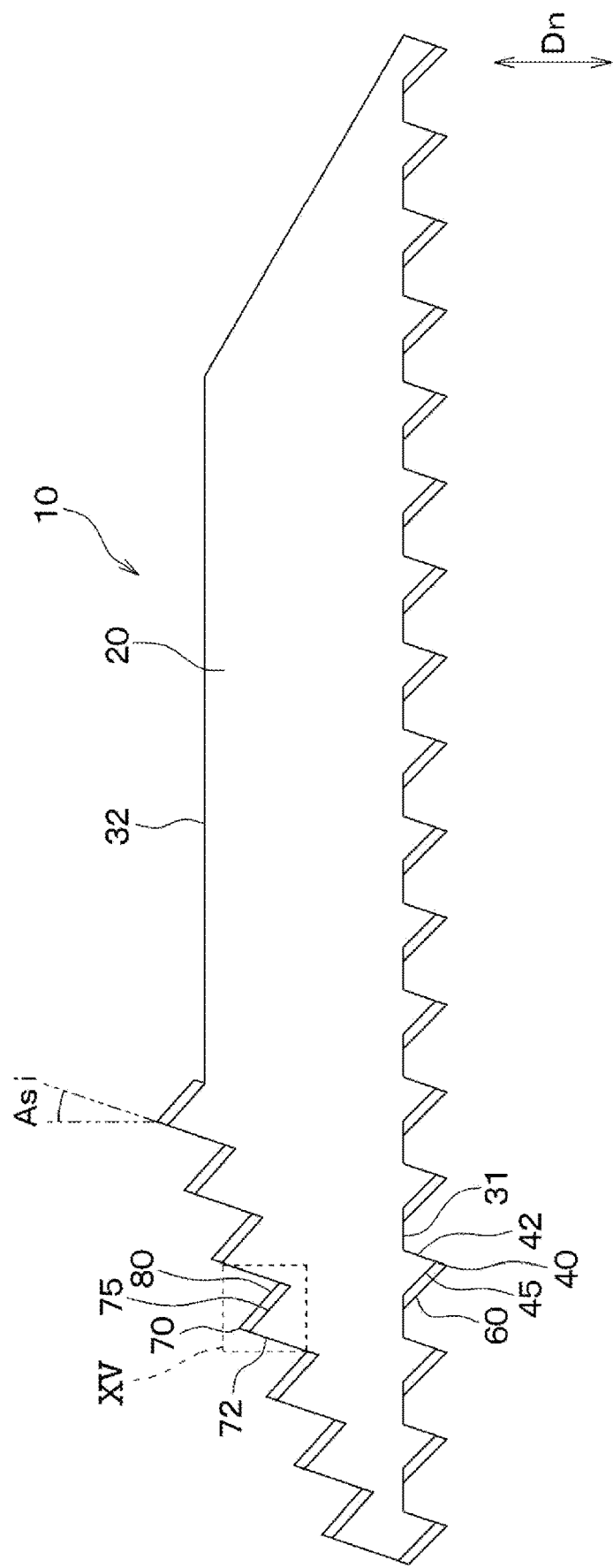
FIG. 14 is a cross-sectional view of an optical member according to a third embodiment.
Figure 15:
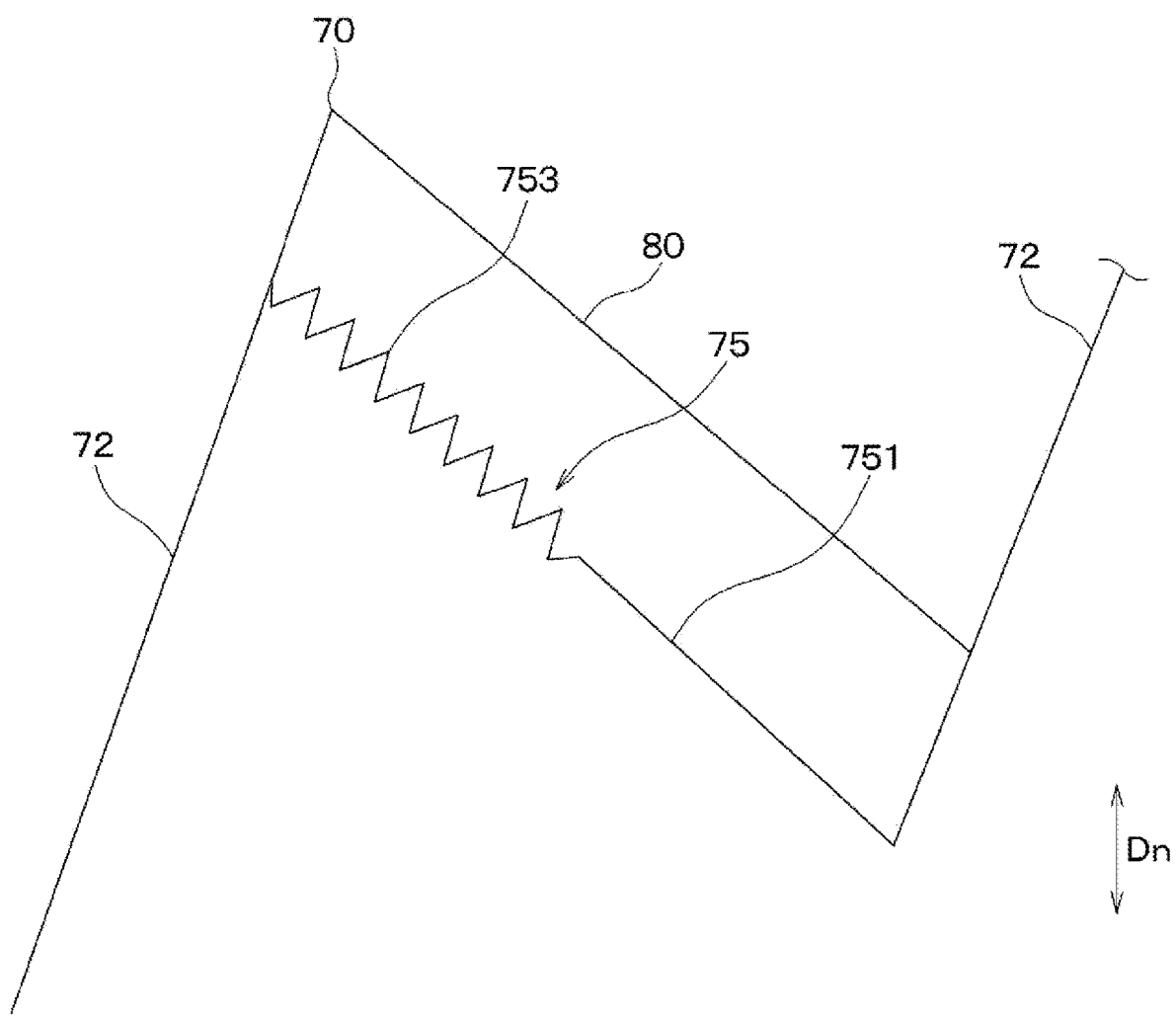
FIG. 15 is an enlarged view of an area XV of FIG. 14.

In the third embodiment, the light guide 20 does not have the incident surface 25. As shown in FIGS. 14 and 15, the light guide 20 has plural incident prisms 70 in addition to the first reflecting surface 31, the second reflecting surface 32 and the prisms 40. The optical member 10 further includes an incident light shielding layer 80 in addition to the light guide 20 and the light shielding layer 60. The other components are similar to those of the first embodiment. The incident prism 70 corresponds to the first prism, and the prism 40 corresponds to the second prism.

The incident prism 70 is formed by molding, cutting, blasting, etc., or a combination thereof when the light guide 20 is formed. The incident prism 70 protrudes outward from the inside of the light guide 20, and is formed in a triangular prism shape. The incident prisms 70 are arranged at a predetermined interval. The incident prism 70 has a prism incident surface 72 and an incident light shielding surface 75.

The external scene light Lo is incident on the prism incident surface 72. The prism incident surface 72 is parallel to the prism exit surface 42 and intersects the first reflecting surface 31 and the second reflecting surface 32. The root-mean-square height of the prism incident surface 72 is, for example, 0.005 µm. The inclination angle of the prism incident surface 72 with respect to the normal direction Dn is the same as the incident surface angle Asi.

As will be described later, the incident light shielding surface 75 blocks the incident light which is the external scene light Lo. As a result, the incident light shielding surface 75 restricts the light reflected by the incident light shielding surface 75 from being emitted from the prism exit surface 42 to become a stray light GLo. Specifically, the incident light shielding surface 75 is connected across the prism incident surface 72. The incident light shielding surface 75 has an incident flat surface 751 and an incident rough surface 753.

One of the incident flat surfaces 751 adjacent to the second reflecting surface 32 is connected to the second reflecting surface 32. The rest of the incident flat surfaces 751 are connected to the prism incident surface 72 at the internal portions of the light guide 20. The root-mean-square height of the incident flat surface 751 is, for example, 0.005 µm.

The incident rough surface 753 is connected to the incident flat surface 751. The incident rough surface 753 is connected to the prism incident surface 72 at the external portion of the light guide 20. The root-mean-square height of the incident rough surface 753 is higher than the root-mean-square height of the prism incident surface 72 and the incident flat surface 751. Therefore, the surface roughness of the incident rough surface 753 is larger than the surface roughness of the prism incident surface 72 and the incident flat surface 751. Furthermore, the root-mean-square height of the incident rough surface 753 is 0.1 µm or more. Further, the ratio of the area of the incident rough surface 753 to the area of the incident light shielding surface 75 is 50% or more. In FIG. 15, the ratio of the area of the incident rough surface 753 to the area of the incident light shielding surface 75 is 50%. While the ratio of the area of the incident rough surface 753 to the area of the incident light shielding surface 75 is 50% or more, the ratio of the width of the incident rough surface 753 to the width of the incident light shielding surface 75 may be 50% or more.

The incident light shielding layer 80 is made of a light absorbing film that absorbs 99% or more of light. The incident light shielding layer 80 is formed, for example with black resin by coating, printing, vapor deposition, or the like. The incident light shielding layer 80 covers the entire surface of each incident light shielding surface 75. As will be described later, the incident light shielding layer 80 blocks light traveling from the blind area toward the incident prism 70. Although the incident light shielding layer 80 covers the entire surface of the incident light shielding surface 75, it is not limited to this, and may cover at least a part of the incident rough surface 753. While the incident light shielding layer 80 is made of black resin, it is not limited to black resin, and may be made of metal, for example.

The optical member 10 of the third embodiment is constructed as described above. The same effects as those of the first embodiment are also obtained in the third embodiment. In the third embodiment, the following effects are also exerted.

Figure 16:
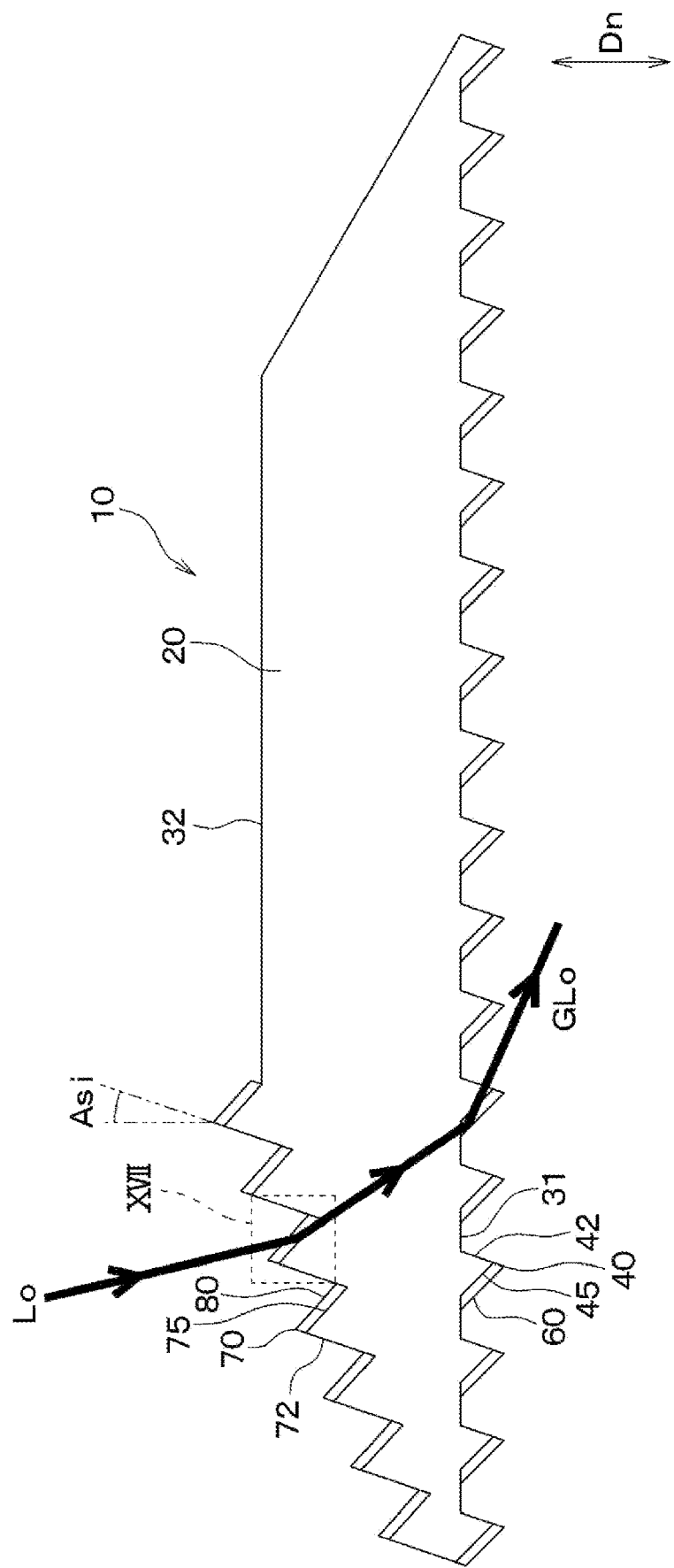
FIG. 16 is a schematic cross-sectional view showing an external scene light incident on an incident light shielding surface of the optical member.

[3-1] As shown in FIG. 16, the external scene light Lo may enter the incident light shielding surface 75 instead of the prism incident surface 72, and the light may be reflected by the prism light shielding surface 45. When the reflected light is emitted from the prism exit surface 42 and travels toward the occupant of the vehicle 1, it becomes a stray light GLo.

Figure 17:
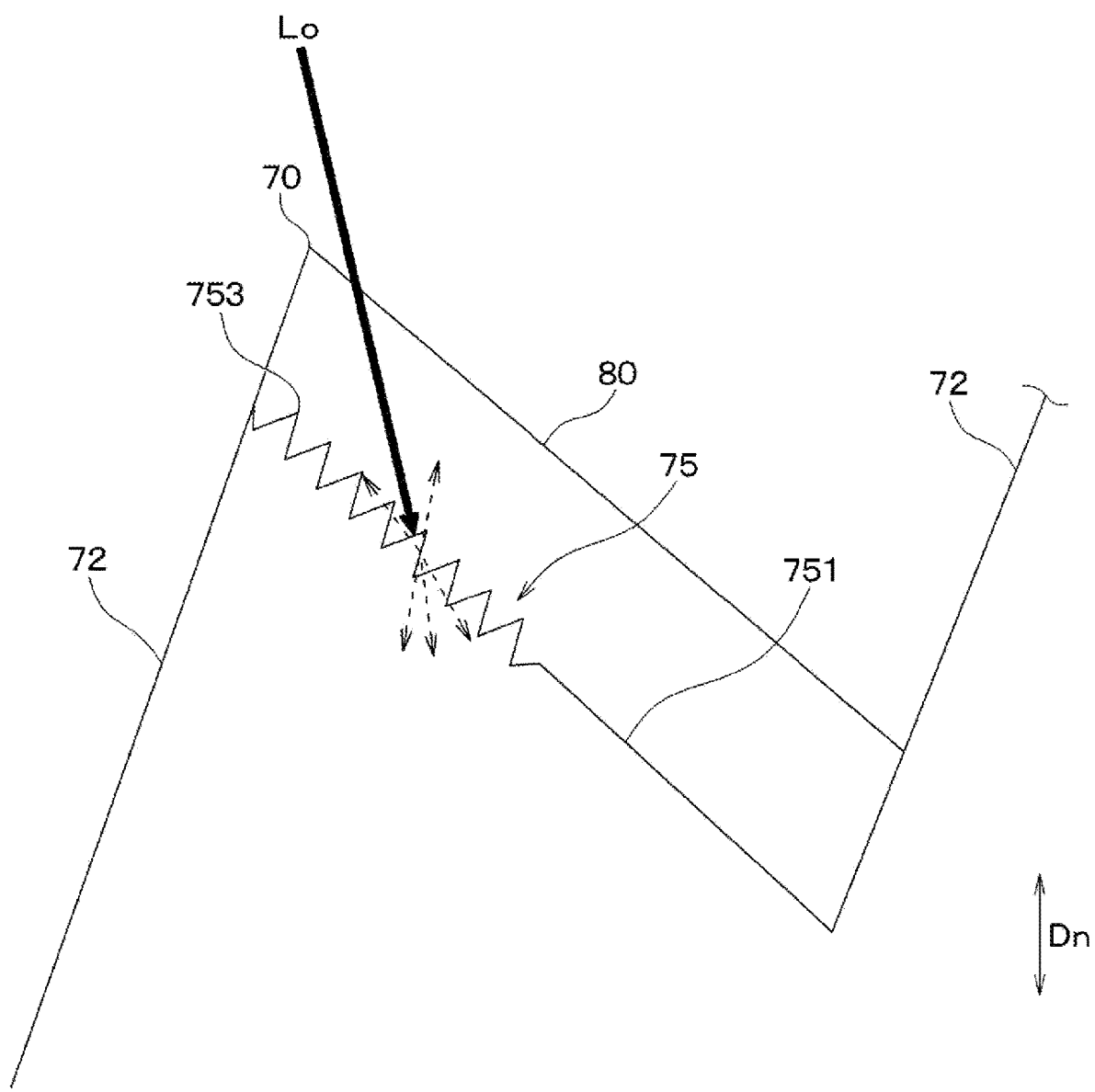
FIG. 17 is an enlarged view of an area XVII of FIG. 16.

Therefore, in the optical member 10 of the third embodiment, the surface roughness of the incident rough surface 753 is larger than the surface roughness of the prism incident surface 72. Accordingly, as shown in FIG. 17, when the external scene light Lo is incident on the incident light shielding surface 75, the incident light is reflected and scattered by the incident rough surface 753. As a result, the amount of light traveling from the incident light shielding surface 75 toward the prism light shielding surface 45 is reduced. Therefore, it becomes difficult for the light from the incident light shielding surface 75 to reach the prism light shielding surface 45. Therefore, the light from the incident light shielding surface 75 is less likely to be reflected by the prism light shielding surface 45, so that the light reflected by the prism light shielding surface 45 is less likely to reach the prism exit surface 42. Therefore, it becomes difficult for the stray light GLo to reach the occupant of the vehicle 1, thereby improving the visibility of the scene in the blind spot area.

[3-2] The incident light shielding surface 75 includes the incident flat surface 751 and the incident rough surface 753. The ratio of the area of the incident rough surface 753 to the area of the incident light shielding surface 75 is 50% or more. As a result, the area of the incident rough surface 753 of the incident light shielding surface 75 is equal to or larger than the area of the incident flat surface 751, so that the probability that the external scene light Lo is reflected by the incident rough surface 753 increases. Therefore, the external scene light Lo incident on the incident light shielding surface 75 is more likely to be reflected and scattered. For this reason, the amount of light traveling from the incident light shielding surface 75 toward the prism light shielding surface 45 tends to decrease. Therefore, it becomes difficult for the light from the incident light shielding surface 75 to reach the prism light shielding surface 45. Therefore, the light from the incident light shielding surface 75 is less likely to be reflected by the prism light shielding surface 45, so that the light reflected by the prism light shielding surface 45 is less likely to reach the prism exit surface 42. Therefore, it becomes difficult for the stray light GLo to reach the occupant of the vehicle 1, thereby improving the visibility of the scene in the blind spot area.

[3-3] The root-mean-square height of the incident rough surface 753 is 0.1 µm or more. This facilitates reflection and scattering of the external scene light Lo incident on the incident light shielding surface 75. For this reason, the amount of light traveling from the incident light shielding surface 75 toward the prism light shielding surface 45 tends to decrease. Therefore, it becomes difficult for the light from the incident light shielding surface 75 to reach the prism light shielding surface 45. Therefore, the light from the incident light shielding surface 75 is less likely to be reflected by the prism light shielding surface 45, so that the light reflected by the prism light shielding surface 45 is less likely to reach the prism exit surface 42. Therefore, it becomes difficult for the stray light GLo to reach the occupant of the vehicle 1, thereby improving the visibility of the scene in the blind spot area.

[3-4] The optical member 10 further includes the incident light shielding layer 80 corresponding to a light shielding portion. The incident light shielding layer 80 covers the incident rough surface 753 and blocks light from the outside of the light guide 20. As a result, the light from the outside of the light guide 20 on the blind spot side is blocked, so that the external scene light Lo is suppressed from becoming the stray light GLo.

[3-5] The incident light shielding layer 80 is made of a light absorbing film that absorbs light. As a result, the external scene light Lo traveling toward the incident light shielding surface 75 is absorbed. For this reason, the external scene light Lo traveling toward the incident light shielding surface 75 is likely to be blocked. Therefore, the external scene light Lo is suppressed from becoming the stray light GLo.

Other Embodiments

The present disclosure is not limited to the above-described embodiments, and the above embodiment can be appropriately modified. In each of the above embodiments, it goes without saying that any element constituting the embodiment is not necessarily essential except the following cases: the case where it is explicitly stated that such element is particularly essential; and the case where it can be considered that such element is obviously essential in principle.

In each of the embodiments, the root-mean-square height is used as the surface roughness. However, the surface roughness is not limited to the root-mean-square height, and may be the maximum peak height, the maximum valley height, the maximum height, the calculated average height, and the like. The maximum peak height, maximum valley height, maximum height, calculated average height, and the like are measured, for example, according to ISO25178 and JISB0601.

In the third embodiment, the light shielding surface 45 of the prism 40 of the light guide 20 includes the rough surface 453, and the incident light shielding surface 75 of the incident prism 70 of the light guide 20 includes the incident rough surface 753. Alternatively, while the incident light shielding surface 75 includes the incident rough surface 753, the prism light shielding surface 45 need not include the rough surface 453.

In the third embodiment, the optical member 10 includes the incident light shielding layer 80. However, the optical member 10 does not have to include the incident light shielding layer 80. In this case, similarly to the second embodiment, the incident rough surface 753 blocks the external scene light Lo instead of the incident light shielding layer 80. In addition, since the optical member 10 does not include the incident light shielding layer 80, the manufacturing process of the optical member 10 is shortened by the step of forming the incident light shielding layer 80. This shortens the manufacturing time of the optical member 10 and reduces the cost of the optical member 10.

In each of the embodiments, the prism 40 and the incident prism 70 have a triangular prism shape, but are not limited to having a triangular prism shape, and may have, for example, a trapezoidal prism shape.

In each of the embodiments, the light shielding layer 60 and the incident light shielding layer 80 are formed of a light absorbing film, but are not limited to being formed of a light absorbing film. The light shielding layer 60 and the incident light shielding layer 80 may be formed with a light diffusion material or retroreflective material.

In each of the embodiments, the second reflecting surface 32 is parallel to the first reflecting surface 31. However, the second reflecting surface 32 is not limited to being parallel to the first reflecting surface 31, and may be not parallel to the first reflecting surface 31 according to the distance from the optical member 10 to the viewer.

What is claimed is:

1. An optical member comprising:
    a first prism having
        an incident surface on which an external scene light is incident from a blind area, and
        a light shielding surface connected to the incident surface and into which the external scene light is incident;
    a light guide having
        a first reflecting surface that reflects light from the incident surface, and
        a second reflecting surface that reflects light reflected by the first reflecting surface; and
    a second prism having
        an exit surface that emits light from the incident surface and light reflected by the second reflecting surface, and
        another surface connected to the exit surface to intersect the exit surface, light from the light shielding surface being incident on the another surface, wherein
    the light shielding surface has a rough surface, and
    a surface roughness of the rough surface is larger than a surface roughness of the incident surface.

2. The optical member according to claim 1, wherein
    the light shielding surface has a flat surface connected to the rough surface,
    the flat surface has a surface roughness smaller than that of the rough surface, and
    a ratio of an area of the rough surface to an area of the light shielding surface is more than or equal to 50%.

3. The optical member according to claim 1, wherein
    the rough surface has a root-mean-square height of 0.1 μm or more.

4. The optical member according to claim 1, further comprising
    a light shielding portion that covers the rough surface to shield light from outside of the light guide.

5. The optical member according to claim 4, wherein
    the light shielding portion is made of a light absorbing film that absorbs light.

* * * * *